US010969666B1

(12) United States Patent
Haseltine

(10) Patent No.: US 10,969,666 B1
(45) Date of Patent: Apr. 6, 2021

(54) METHODS AND SYSTEMS OF DISPLAYING AN IMAGE FREE OF MOTION-BLUR USING SPINNING PROJECTORS

(71) Applicant: Disney Enterprises, Inc., Burbank, CA (US)

(72) Inventor: Eric C. Haseltine, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/547,283

(22) Filed: Aug. 21, 2019

(51) Int. Cl.
*G03B 21/14* (2006.01)
*H04N 9/31* (2006.01)
*G03B 21/20* (2006.01)

(52) U.S. Cl.
CPC ......... *G03B 21/142* (2013.01); *G03B 21/145* (2013.01); *G03B 21/2046* (2013.01); *H04N 9/3147* (2013.01)

(58) Field of Classification Search
CPC ........ G03B 21/28; G03B 21/56; G03B 21/62; G03B 21/142; G03B 21/145; G03B 21/208; G03B 21/2046; G03B 21/2053; G03B 35/08; G03B 35/18; G03B 35/20; H04N 9/3141; H04N 9/3147; H04N 9/3155; H04N 9/3158; H04N 9/3164
See application file for complete search history.

(56) References Cited

U.S. PATENT DOCUMENTS

| 4,687,167 | A | 8/1987 | Skalka |
|---|---|---|---|
| 4,943,851 | A | 7/1990 | Lang |
| 5,057,827 | A | 10/1991 | Nobile |
| 5,148,310 | A | 9/1992 | Batchko |
| 5,239,892 | A | 8/1993 | Sakai |
| 5,437,235 | A | 8/1995 | Randolph |
| 5,714,997 | A | 2/1998 | Anderson |
| 6,115,006 | A | 9/2000 | Brotz |

(Continued)

FOREIGN PATENT DOCUMENTS

| JP | S58-154913 U | 10/1983 |
|---|---|---|
| JP | H1-280992 A | 11/1989 |

(Continued)

OTHER PUBLICATIONS

Horimai, Hideyoshi, et al. "Full-Color 3D Display System with 360 Degree Horizontal Viewing Angle." *Proc. Int. Symposium of 3D and Contents*, 2010. pp. 1-4.

(Continued)

*Primary Examiner* — Sultan Chowdhury
(74) *Attorney, Agent, or Firm* — Farjami & Farjami LLP

(57) ABSTRACT

According to one implementation, an image display system includes a motor configured to spin a rotor, first and second projectors, a projection screen having a first projection surface on a first side and a second projection surface on a second side opposite the first side, and a controller. The controller causes the motor to spin the rotor that spins the projection screen, the first projector, and the second projector about an axis, displays a first perspective of an image on the first projection surface using the first projector, and concurrently with displaying the first perspective of the image on the first projection surface, displays a second perspective of the image on the second projection surface using the second projector.

20 Claims, 9 Drawing Sheets

(56) References Cited

U.S. PATENT DOCUMENTS

| | | |
|---|---|---|
| 6,183,088 B1 | 2/2001 | LoRe |
| 6,208,318 B1 | 3/2001 | Anderson |
| 6,481,851 B1 | 11/2002 | McNelley |
| 6,801,185 B2 | 10/2004 | Salley |
| 7,002,604 B1 | 2/2006 | Barrus |
| 7,477,252 B2 | 1/2009 | Chun |
| 7,490,941 B2 | 2/2009 | Mintz |
| 7,587,120 B2 | 9/2009 | Koo |
| 7,708,640 B2 | 5/2010 | Burak |
| 8,233,032 B2 | 7/2012 | Yukich |
| 8,698,966 B2 | 4/2014 | Liu |
| 9,053,660 B2 | 6/2015 | Liu |
| 9,186,595 B1 | 11/2015 | Cannon |
| 10,310,284 B1 | 6/2019 | Waldron |
| 2003/0142067 A1 | 7/2003 | Kurtenbach |
| 2004/0082283 A1 | 4/2004 | Lindell |
| 2004/0196362 A1 | 10/2004 | Hoshino |
| 2005/0035962 A1 | 2/2005 | Ishibashi |
| 2005/0083570 A1 | 4/2005 | Ueda |
| 2005/0284997 A1 | 12/2005 | Tisbo |
| 2007/0293299 A1 | 12/2007 | Aida |
| 2009/0312979 A1 | 12/2009 | Pan |
| 2010/0007582 A1 | 1/2010 | Zalewski |
| 2010/0195055 A1* | 8/2010 | Maekawa ............... G02B 5/136 353/10 |
| 2011/0199373 A1 | 8/2011 | Liu |
| 2012/0194419 A1 | 8/2012 | Osterhout |
| 2012/0293941 A1 | 11/2012 | Myerchin |
| 2013/0033650 A1* | 2/2013 | Roberts ................ G03B 21/625 348/744 |
| 2013/0050198 A1 | 2/2013 | Song |
| 2013/0092805 A1 | 4/2013 | Funk |
| 2013/0100126 A1 | 4/2013 | Kim |
| 2013/0100358 A1 | 4/2013 | De Collibus |
| 2013/0343743 A1 | 12/2013 | Yen |
| 2014/0118271 A1 | 5/2014 | Lee |
| 2014/0307068 A1 | 10/2014 | Song |
| 2015/0193084 A1 | 7/2015 | Juni |
| 2015/0212718 A1 | 7/2015 | Kellhammer |
| 2015/0288857 A1 | 10/2015 | Fay |
| 2017/0023911 A1* | 1/2017 | Russell ................ G03H 1/0005 |
| 2017/0038829 A1 | 2/2017 | Lanier |
| 2017/0115488 A1 | 4/2017 | Ambrus |
| 2017/0343804 A1 | 11/2017 | Choi |
| 2018/0024373 A1 | 1/2018 | Joseph |
| 2018/0224678 A1 | 8/2018 | Jung |
| 2019/0156710 A1 | 5/2019 | Hanson |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

File History of Related U.S. Appl. No. 15/888,896, filed Feb. 5, 2018, and titled "Floating Image Display System,".

File History of Related U.S. Appl. No. 15/985,477, filed May 21, 2018, and titled "Electrical Charger for a Spinning Device,".

File History of Related U.S. Appl. No. 15/985,502, filed May 21, 2018, and titled "Display of a Floating Image with Depth Enhancement,".

File History of Related U.S. Appl. No. 15/983,006, filed May 17, 2018, and titled "Multi-Perspective Display of an Image,".

File History of Related U.S. Appl. No. 16/011,505, filed Jun. 18, 2018, and titled "Image Display System With Visual Filter,".

File History of Related U.S. Appl. No. 16/002,947, filed Jun. 7, 2018, and titled "Image Generation System Including a Spinning Display,".

File History of Related U.S. Appl. No. 16/197,198, filed Nov. 20, 2018, and titled "Communication System Generating a Floating Image of a Remote Venue,".

File History of Related U.S. Appl. No. 16/224,717, filed Dec. 18, 2018, and titled "Stereoscopic Image Display System,".

File History of Related U.S. Appl. No. 16/516,873, filed Jul. 19, 2019, and titled "Rotational Blur-Free Image Generation,".

File History of Related U.S. Appl. No. 16/532,243, filed Aug. 5, 2019, and titled "Image Generation Using a Spinning Display and Blur Screen,".

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

* cited by examiner

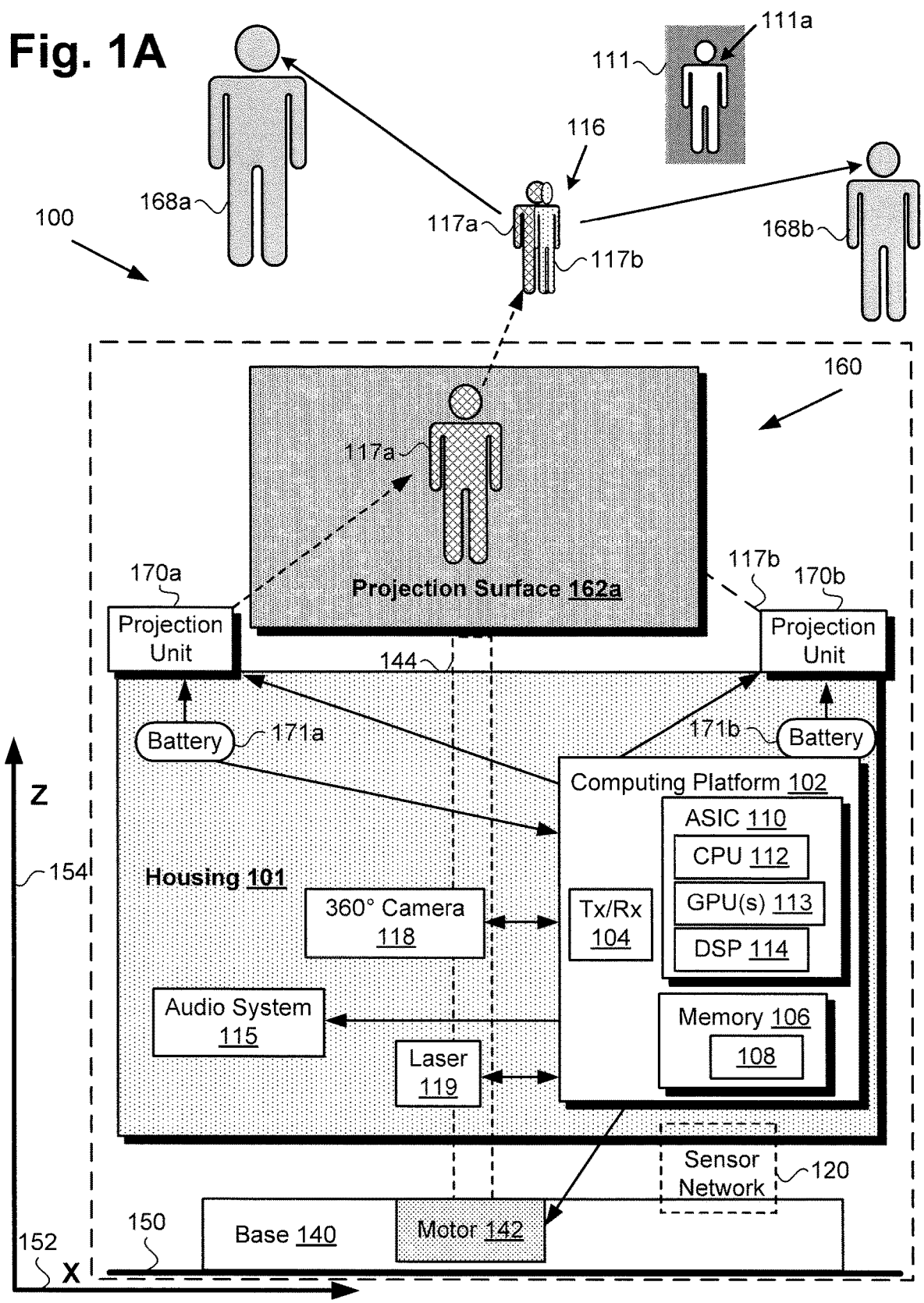

METHODS AND SYSTEMS OF DISPLAYING AN IMAGE FREE OF MOTION-BLUR USING SPINNING PROJECTORS

BACKGROUND

Increases in computing power have made possible the generation of richly featured virtual imagery capable of simulating in-person interactivity. However, the display screens with which many modern communication devices are equipped are typically designed to display a two-dimensional (2D) image from a single viewing perspective. As a result, and despite their ability to display sharp, richly featured, high definition images, interactive group communications such as video conferencing and multi-player gaming using those devices tend to be less engaging and immersive than if the participants could be provided with the illusion of being together in person.

An alternative to the conventional approach to providing 2D images is to render group communications using 3D imagery. For example, a spinning display may be used to generate an apparently three-dimensional (3D) image that appears to float in space. However, rotational and translational motion-blur resulting from spinning of a conventional display screen may be readily detectable to the eye of a human user, and may undesirably reduce the immersiveness of the interactive experience for the user.

SUMMARY

There are provided systems and methods for displaying an image free of motion-blur using spinning projectors, substantially as shown in and/or described in connection with at least one of the figures, and as set forth more completely in the claims.

BRIEF DESCRIPTION OF THE DRAWINGS

FIG. 1A shows a diagram of an image display system for generating multiple perspectives of a floating image free of motion-blur, according to one implementation;

DETAILED DESCRIPTION

Figure 1B:
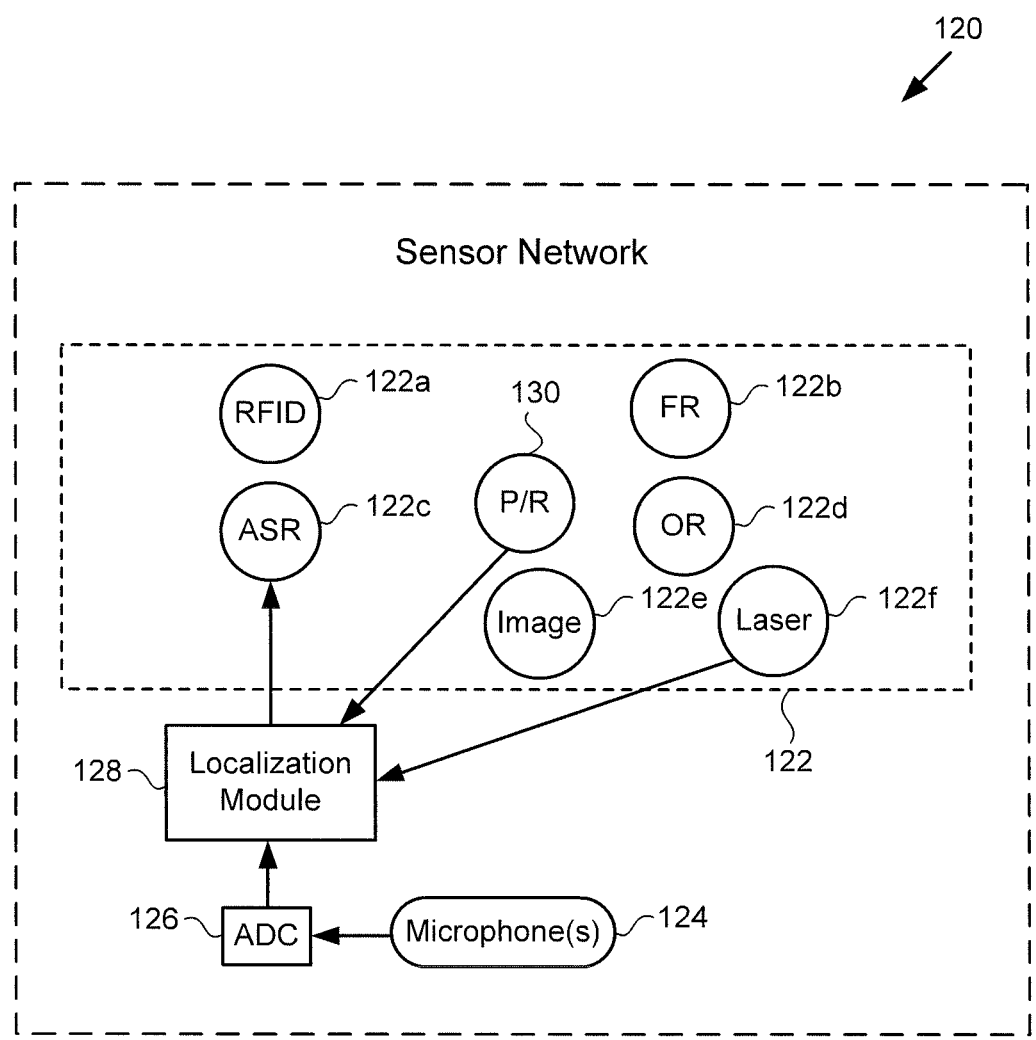
FIG. 1B shows a diagram of an exemplary sensor network suitable for use as part of the image display system of FIG. 1A, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A shows a diagram of exemplary image display system 100 for generating multiple perspectives of a floating image that are substantially free of motion-blur, according to one implementation. As shown in FIG. 1A, image display system 100 includes projection screen 160 and housing 101 configured to rotate with rotor 144, as well as stationary base 140 coupled to housing 101 and projection screen 160 by rotor 144. Housing 101 includes computing platform 102 communicatively coupled to motor 142 integrated with base 140, first projection unit 170a, second projection unit 170b, audio system 115, optional 360° degree camera 118, optional laser 119, and sensor network 120 bridging stationary base 140 and housing 101.

In addition, housing 101 can also include batteries 171a and 171b. As shown in FIG. 1A, batteries 171a and 171b may be situated on opposite sides of housing 101, and may be used to provide power to first and second projection units 170a and 170b, as well as to computing platform 102. Batteries 171a and 171b may be deployed on opposite sides of housing 101 to optimize both static and dynamic balance of image display system 100.

As further shown in FIG. 1A, computing platform 102 may include transceiver 104, application specific integrated circuit (ASIC) 110 (hereinafter "controller 110") including central processing unit (CPU) 112 implemented as a hardware processor, one or more graphics processing unit(s) (GPU(s)) 113, and may further include digital signal processor (DSP) 114. Computing platform 102 may also include system memory 106 implemented as a non-transitory storage device storing software code 108.

According to the exemplary implementation shown in FIG. 1A, base 140 includes motor 142 for spinning rotor 144, housing 101, and projection screen 160. Moreover, according to the present exemplary implementation, first projection unit 170a and second projection unit 170b are mounted on or otherwise secured to housing 101 on opposite sides of projection screen 160, and are configured to spin with rotor 144, housing 101, and projection screen 160. In some use cases, it may be advantageous or desirable to implement motor 142 as a brushless synchronous motor, due to the high temporal stability of such a motor. It is noted that, in some implementations, batteries 171a and 171b may be used to drive motor 142. However, in other implementations, motor 142 can be driven by a separate, wall-plug driven power supply (wall-plug driven power supply not shown in FIG. 1A).

Base 140 is situated on surface 150, which may be a floor or any other substantially horizontal surface. In addition, FIG. 1A shows horizontal axis 152 (hereinafter also "X axis 152") substantially parallel to surface 150, and vertical axis 154 (hereinafter also "Z axis") substantially perpendicular to surface 150 and X axis 152. Also shown in FIG. 1A are image 116 appearing to float in space (hereinafter "floating image 116"), first perspective 117a of floating image 116 projected onto first projection surface 162a of projection screen 160 by first projection unit 170a, local observers 168a and 168b of floating image 116, and remote venue 111 from which, in some implementations, source image 111a corresponding to floating image 116 may originate.

It is noted that, although not visible from the perspective shown in FIG. 1A, second perspective 117b of floating image 116 is projected onto a second projection surface of projection screen 160 opposite to first projection surface 162a by second projection unit 170b. It is further noted that the depiction of first and second projection units 170a and 170b in FIG. 1A is provided in the interests of conceptual clarity. A more accurate representation according to the perspective shown by FIG. 1A would have first projection unit 170a situated on housing 101 in front of and obscuring portions of rotor 144 and first projection surface 162a, while second projection unit 170b would be situated on housing 101 behind rotor 144 and projection screen 160, and would be at least partially obscured by first projection unit 170a.

It is also noted that the combination of motor 142, sensor network 120, and computing platform 102 including controller 110 enable the necessary time synchronization between the revolutions per minute (rpm) of motor 142 and rotor 144, and the frame rate in frames per second (fps) at which image display system 100 can render respective perspectives 117a and 117b of floating image 116 on projection screen 160.

For the purposes of the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 108, from system memory 106. A GPU is configured to reduce the processing overhead of the CPU by performing computationally intensive graphics processing tasks.

In addition, for the purposes of the present application, the term "perspective" refers to the particular viewing angle from which an object, virtual object, or image is viewed by an observer. Referring to FIG. 1A, for example, a perspective of floating image 116 refers to the viewing angle of an observer of floating image 116 with respect to an imaginary circle substantially concentric with rotor 144 of image display system 100, in a plane substantially perpendicular to rotor 144 and vertical Z axis 154.

Moreover, the terms "render" and "rendering" are defined to mean causing one or more images to be displayed on a projection screen, such as projection screen 160 for example. Thus, rendering an image may mean causing an entirely new image to be displayed on the projection screen, or refreshing an image previously displayed on the projection screen.

With respect to the term "display interval," as used in the present application, "display interval" refers to a predetermined time interval during a rotation of first and second projection units 170a and 170b and projection screen 160 by rotor 144 during which at least one of first and second perspectives 117a and 117b is displayed using respective projection units 170a and 170b. Thus, a display interval of first and second projection units 170a and 170b will typically be substantially less than the time required for rotor 144 to complete a single rotation. As a specific example, rotor 144 may have a spin rate in a range from approximately 900 rpm to approximately 3600 rpm, which translates to a range of time intervals from approximately sixty-seven milliseconds (67 ms) to approximately 17 ms. By contrast, a display interval of first and second projection units 170a and 170b will typically be less than or equal to 1.0 ms.

Although FIG. 1A shows two observers 168a and 168b, that representation is also provided merely for conceptual clarity. More generally, observers 168a and 168b may correspond to a single observer, or to more or many more than two observers who may be positioned so as to view floating image 116 from a variety of perspectives. For example, in some implementations, observers 168a and 168b may be situated so as to view floating image 116 from a number of discrete perspectives, such as two discrete perspectives located approximately one hundred and eighty degrees (180°) apart on a 360° circle surrounding floating image 116 and concentric with rotor 144 in a plane substantially perpendicular to rotor 144 and vertical Z axis 154. However, in other implementations, observers 168a and 168b may be able to view floating image 116 from the perspectives of other locations on such a circle surrounding floating image 116, such as four locations approximately 90° apart on the circle, or six locations approximately 60° apart, for example.

In some implementations, observers 168a and 168b may be interactively engaged with remote venue 111 from which the source image originates via image display system 100 including computing platform 102, 360° camera 118, laser 119, first and second projection units 170a and 170b, audio system 115, sensor network 120, and projection screen 160. That is to say, in those implementations, controller 110 may be configured to execute software code 108 to utilize transceiver 104, first and second projection units 170a and 170b, audio system 115, sensor network 120, GPU(s) 113, and projection screen 160 to generate and display floating image 116 corresponding to source image 111a during communications with remote venue 111.

Although FIG. 1A depicts audio system 115 as structurally integrated with housing 101, that representation is merely exemplary. In various implementations, audio system 115 may be wholly integrated with housing 101, may include elements, such as audio speakers, controlled by computing platform 102 but remote from housing 101, or may be partially integrated with housing 101 while including remote audio elements. In one implementation, audio system 115 may include a theater quality Dolby® high definition (HD) surround-sound system, for example.

According to the exemplary implementation shown in FIG. 1A, image display system 100 includes an image capture device in the form of 360° camera 118 communicatively coupled to computing platform 102. It is noted that, in some implementations, 360° camera 118 may be communicatively coupled to, but not structurally integrated with, housing 101. For example, 360° camera 118 may be strategically situated in a venue local to image display system 100 to capture images of the local venue, as well as gestures and/or facial expressions by observers 168a and 168b. Alternatively, in some implementations, 360° camera 118 may be mounted on or otherwise integrated with stationary base 140 or with housing 101. In various implementations, 360° camera 118 may be in wireless communication with computing platform 102 and may be wirelessly controlled by controller 110.

As further shown in FIG. 1A, in some implementations, image display system 100 may further include an image capture device including laser 119 communicatively coupled to computing platform 102 and configured to rotate with housing 101. Laser 119 may be controlled by CPU 112 of controller 110 and may be implemented in conjunction with a laser sensor included in sensor network 120 (laser sensor not shown in FIG. 1A) to function as a Lidar type probe for mapping the venue local to image display system 100 and/or determining the locations of observers 168a and 168b within that local venue.

Transceiver 104 may be implemented as a wireless communication unit controlled by CPU 112 of controller 110 and enabling image display system 100 to exchange data with remote venue 111. For example, transceiver 104 may be implemented to support communication via WiFi, may take the form of a 3G or 4G wireless transceiver, or may be a 5G wireless transceiver configured to satisfy the IMT-2020 requirements established by the International Telecommunication Union (ITU).

FIG. 1B shows a more detailed exemplary implementation of sensor network 120, in FIG. 1A. As shown in FIG. 1B, sensor network 120 includes multiple sensors 122 controlled by CPU 112 of controller 110. According to the exemplary implementation shown in FIG. 1B, sensor network 120 also includes one or more microphone(s) 124, analog-to-digital converter (ADC) 126, and localization module 128. As further shown in FIG. 1B, sensors 122 of sensor network 120 may include radio-frequency identification (RFID) sensor 122a, facial recognition (FR) sensor 122b, automatic speech recognition (ASR) sensor 122c, object recognition (OR) sensor 122d, image sensor 122e, laser sensor 122f, and one or more position and/or rate (P/R) sensor(s) 130.

It is noted that the specific sensors shown to be included among sensors 122 of sensor network 120 are merely exemplary, and in other implementations, sensors 122 of sensor network 120 may include more, or fewer, sensors than RFID sensor 122a, FR sensor 122b, ASR sensor 122c, OR sensor 122d, image sensor 122e, laser sensor 122f, and P/R sensor(s) 130. RFID sensor 122a, FR sensor 122b, ASR sensor 122c, OR sensor 122d, image sensor 122e, laser sensor 122f, and P/R sensor(s) 130 may be implemented using any suitable sensors for those respective functions, as known in the art. Microphone(s) 124 may include one or more stationary and/or moving microphone(s). For example, stationary microphone(s) of microphone(s) 124 may be distributed in a 360° array surrounding base 140 to enhance directional sensing of sound, such as speech, produced by one or more of observers 168a and 168b.

In some implementations, one or more moving microphone(s) of microphone(s) 124 may rotate in synchronization with rotor 144, housing 101, and projection screen 160. In those implementations, P/R sensor(s) 130 may be used in combination with microphone(s) 124 to identify the direction from which a sound sensed using microphone(s) 124 is received.

Image sensor 122e may correspond to one or more sensors for obtaining visual images of observers 168a and 168b, as well as the local venue in which image display system 100 and observers 168a and 168b are located. Image sensor 122e may be implemented as one or more stationary and/or rotating video cameras, for example.

As indicated in FIG. 1B, in some implementations, data from P/R sensor(s) 130, and/or data from laser sensor 122f, and/or data generated by ADC 126 from sounds detected by microphone(s) 124 may be processed by localization module 128 to identify the distance and/or direction of the respective sources of the sounds received by microphone(s) 124, such as observers 168a and 168b. In those implementations, the output from localization module 128 may be provided to ASR sensor 122c to enhance the performance of ASR sensor 122c in discriminating among environmental sounds, noise, and purposeful speech by one or more of observers 168a and 168b.

Figure 1C:
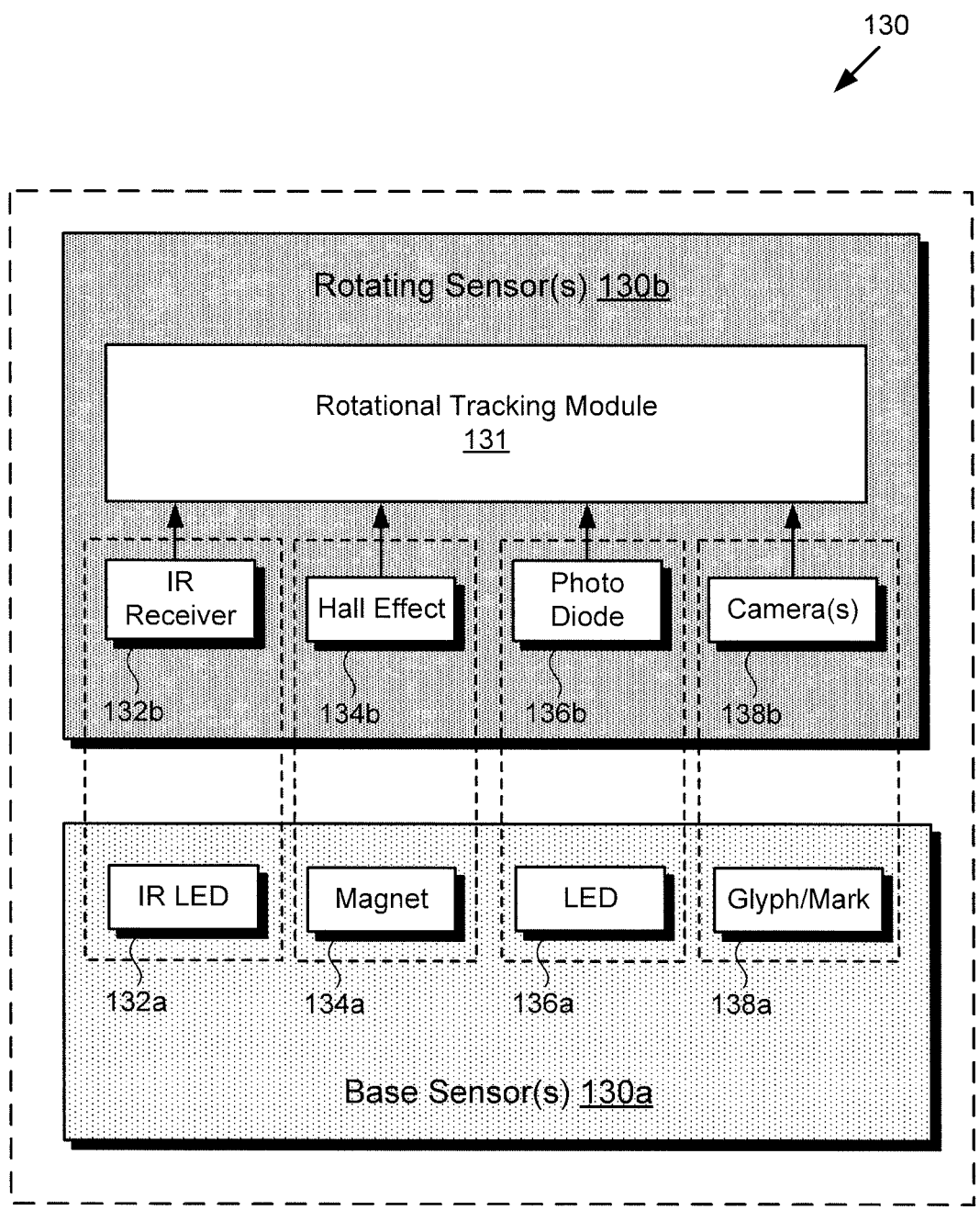
FIG. 1C shows a diagram of exemplary position and/or rate (P/R) sensors suitable for use as part of the image display system of FIG. 1A, according to one implementation.

FIG. 1C shows a more detailed exemplary implementation of P/R sensor(s) 130, in FIG. 1B. As shown in FIG. 1C, P/R sensor(s) 130 can include one or more base sensor(s) 130a integrated with base 140, and one or more rotating sensor(s) 130b integrated with housing 101 and configured to spin with housing 101.

According to the exemplary implementation shown in FIG. 1C, base sensor(s) 130a may include one or more of infrared (IR) light-emitting diode (LED) 132a, magnet 134a, visible light LED 136a, and glyph or other visible marker 138a, to name a few examples. As further shown in FIG. 1C, rotating sensor(s) 130b may include one or more of IR receiver 132b for sensing IR LED 132a, Hall effect sensor 134b for sensing magnet 134a, photo diode 136b for sensing visible light LED 136a, and one or more camera(s) 138b for sensing glyph or visible marker 138a. In addition, rotating sensor(s) 130b are shown to be coupled to rotational tracking module 131.

It is noted that the distribution of features identified by reference numbers 132a, 134a, 136a, 138a, 132b, 134b, 136b, and 138b between base sensor(s) 130a and rotating sensor(s) 130b is merely exemplary. In another implementation, for example, the positions of features 132a, 134a, 136a, 138a, 132b, 134b, 136b, and 138b may be reversed. That is to say, one or more of IR LED 132a, magnet 134a, visible light LED 136a, and glyph or visible marker 138a may be included as rotating sensor(s) 130b, while one or more of IR receiver 132b, Hall effect sensor 134b, photo diode 136b, and camera(s) 138b may be included as base sensor(s) 130a. It is further noted that camera(s) 138b may include one or more still camera(s) and/or one or more video camera(s), for example.

As indicated in FIG. 1C, in some implementations, data from one or more of IR receiver 132b, Hall effect sensor 134b, photo diode 136b, and camera 138b is processed by rotational tracking module 131 to identify the rotational position of projection screen 160 being tracked by P/R sensor(s) 130 at any point in time. In those implementations, the output from rotational tracking module 131 may be provided to controller 110 or software code 108 to enhance the performance of image display system 100 in displaying multiple perspectives of floating image 116, or in capturing image data of the venue local to image display system 100 for transmission to remote venue 111.

As noted above by reference to FIG. 1A, in some implementations, motor 142 may be a brushless synchronous motor, due to the high temporal stability of such a motor. Moreover, in some implementations, the spin rate at which motor 142 spins rotor 144, first projection unit 170a, second projection unit 170b, housing 101, and projection screen 160 can be served, based on inputs from P/R sensor(s) 130 and/or rotational tracking module 131, to ensure that first and second perspectives 117a and 117b of floating image 116 display are in reliably appropriate and repeatable positions for each of observers 168a and 168b.

Figure 2A:
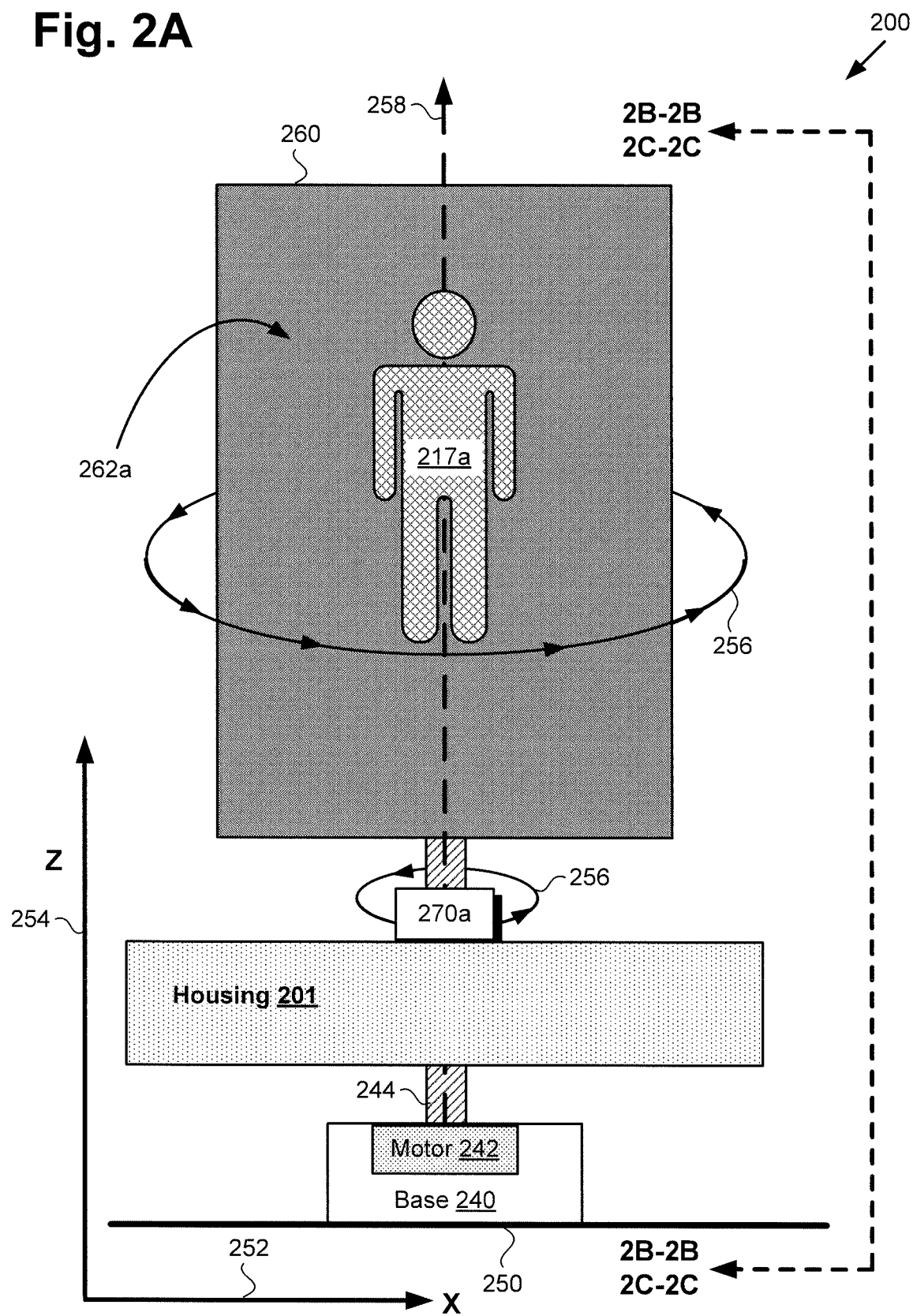
FIG. 2A shows a diagram of an exemplary image display system for generating multiple perspectives of a floating image free of motion-blur, according to another implementation.

FIG. 2A shows a diagram of an exemplary image display system for generating multiple perspectives of a floating image free of motion-blur, according to another implementation. As shown in FIG. 2A, image display system 200 includes stationary base 240, first projection unit 270*a* mounted on or otherwise secured to housing 201, and projection screen 260. Base 240 is shown to include motor 242, and to be situated on surface 250, which may be a floor or any other substantially horizontal surface. In addition, according to the exemplary implementation shown in FIG. 2A, image display system 200 includes rotor 244 coupling base 240 to housing 201 and projection screen 260.

Housing 201 includes first projection unit 270*a* mounted on or otherwise secured to housing 201 and configured to spin with rotor 244, housing 201, and projection screen 260. In addition, FIG. 2A shows first projection surface 262*a* of projection screen 260 having first perspective 217*a* corresponding to first perspective 117*a* of floating image 116, in FIG. 1A, displayed thereon by first projection unit 270*a*. Also shown in FIG. 2A are horizontal X axis 252 substantially parallel to surface 250, vertical Z axis 254 substantially perpendicular to surface 250, spin direction 256 of rotor 244, housing 201, first projection unit 270*a*, and projection screen 260, as well as perspective lines 2B-2B and 2C-2C.

As further shown FIG. 2A, rotor 244 is configured to spin housing 201, first projection unit 270*a* secured to housing 201, and projection screen 260 about axis of rotation 258 of rotor 244, which is parallel to vertical Z axis 254 and perpendicular to horizontal X axis 252. It is noted that projection screen 260 is situated on axis of rotation 258 of rotor 244, housing 201, first projection unit 270*a*, and projection screen 260. For example, in some implementations, projection screen 260 may be sufficiently thin to have first projection surface 262*a* and a second projection surface opposite first projection surface 262*a* precisely aligned on axis of rotation 258, and so as to be centered on axis of rotation 258 (second projection surface not visible from the perspective shown by FIG. 2A).

Image display system 200 corresponds in general to image display system 100, in FIG. 1A. As a result, image display system 200 may share any of the characteristics attributed to image display system 100 by the present disclosure, and vice versa. For example, like image display system 100, image display system 200 includes sensor network 120 bridging base 240 and housing 201. In addition, rotor 244, base 240, and motor 242, correspond in general to rotor 144, base 140, and motor 142, in FIG. 1A. Thus, rotor 244, base 240, and motor 242 may share any of the characteristics attributed to rotor 144, base 140, and motor 142 by the present disclosure, and vice versa.

Moreover, projection screen 260 having first projection surface 262*a* displaying first perspective 217*a*, in FIG. 2A, corresponds in general to projection screen 160 having first projection surface 162*a* displaying first perspective 117*a* of floating image 116, in FIG. 1A. Thus, projection screen 260 may share any of the characteristics attributed to projection screen 160 by the present disclosure, and vice versa.

Housing 201 and first projection unit 270*a* mounted on or otherwise secured to housing 201 correspond respectively in general to housing 101 and first projection unit 170*a*, in FIG. 1A. In other words, although not explicitly shown in FIG. 2A, housing 201 includes features corresponding respectively to computing platform 102 including transceiver 104, controller 110 having CPU 112, GPU(s) 113, optional DSP 114, and batteries 171*a* and 171*b*, and may include system memory 106 storing software code 108. In addition, computing platform 102 of housing 201 may be communicatively coupled to one or more of, audio system 115, 360° degree camera 118, and laser 119. Furthermore, and although also not shown in the perspective offered by FIG. 2A, image display system 200 further includes a second projection unit corresponding to second projection unit 170*b* mounted on or otherwise secured to housing 201 on the opposite side of rotor 244 from first projection unit 270*a*.

Figure 2B:
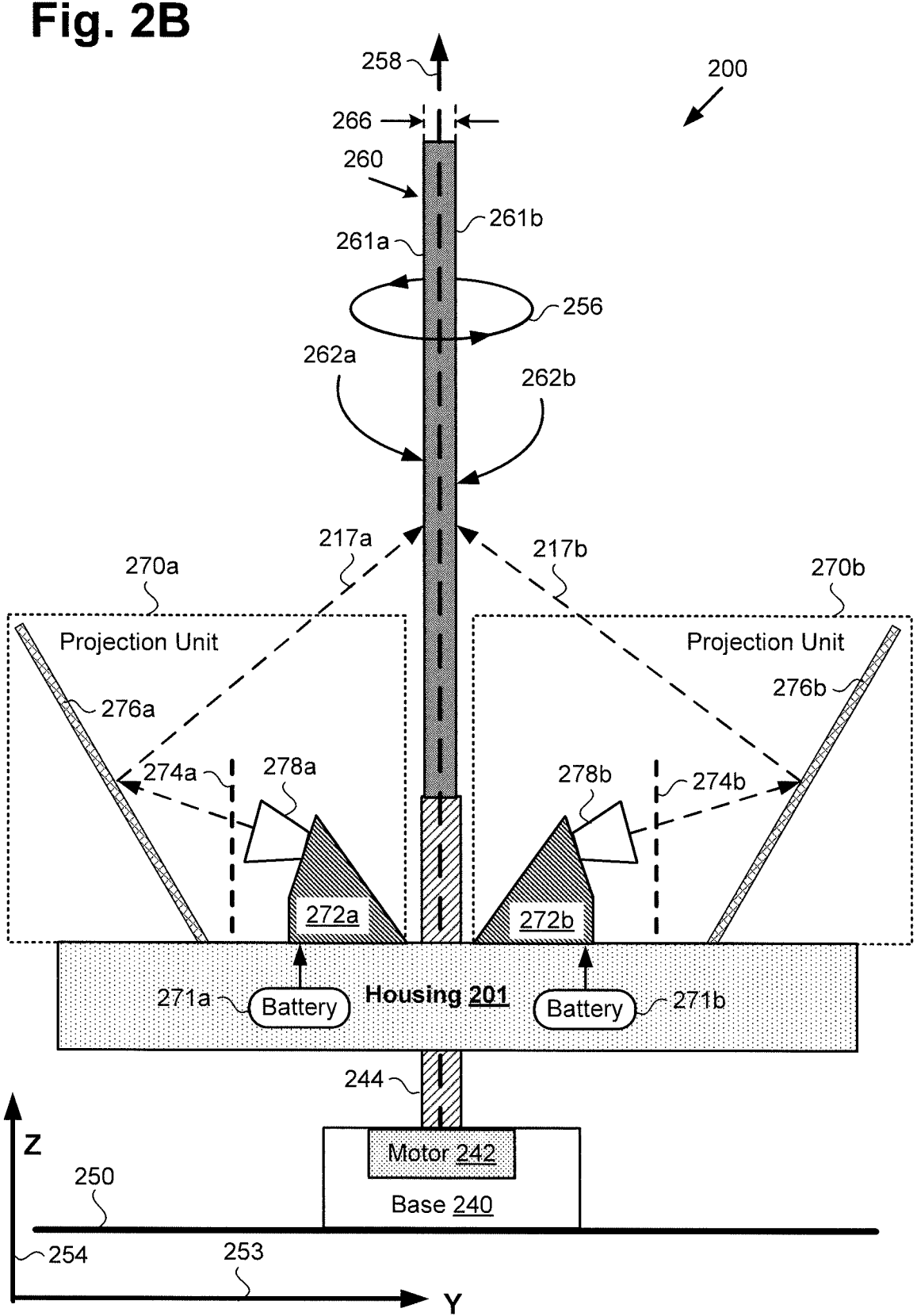
FIG. 2B shows a side view of the exemplary image display system shown in FIG. 2A along perspective lines 2B-2B in that figure, according to one implementation.

FIG. 2B shows a side view of exemplary image display system 100/200 along perspective lines 2B-2B in FIG. 2A, according to one implementation. It is noted that the features identified in FIG. 2B by reference numbers identical to reference numbers shown in FIG. 2A correspond respectively to those previously described features and may share any of the characteristics attributed to those corresponding features by the present disclosure, and vice versa.

As shown in FIG. 2B, image display system 100/200 includes stationary base 140/240, first projection unit 170*a*/270*a* mounted on or otherwise secured to housing 101/201, battery 271*a* for powering first projection unit 170*a*/270*a*, second projection unit 270*b* mounted on or otherwise secured to housing 101/201 opposite first projection unit 170*a*/270*a*, and battery 271*b* for powering second projection unit 270*b*. Image display system 100/200 further includes projection screen 160/260 having first projection surface 162*a*/262*a* on first side 261*a* of projection screen 160/260 and second projection surface 262*b* on second side 261*b* of projection screen 160/260 opposite to first side 261*a*.

It is noted that second projection unit 270*b* corresponds in general to second projection unit 170*b*, in FIG. 1A. That is to say, second projection unit 170*b* may share any of the characteristics attributed to second projection unit 270*b* by the present disclosure, and vice versa. It is further noted that batteries 271*a* and 272*b*, in FIG. 2B, correspond respectively in general to batteries 171*a* and 171*b*, in FIG. 1A. Thus, batteries 271*a* and 271*b* may share any of the characteristics attributed to batteries 171*a* and 171*b* by the present disclosure, and vice versa. In addition, FIG. 2B depicts second perspective 217*b* corresponding to second perspective 117*b* of floating image 116, in FIG. 1A.

Base 140/240 is shown to include motor 142/242, and to be situated on surface 150/250, which may be a floor or any other substantially horizontal surface. In addition, according to the exemplary implementation shown in FIG. 2B, image display system 100/200 includes rotor 144/244 coupling base 140/240 to housing 101/201 and projection screen 160/260. Also shown in FIG. 2B are axis of rotation 258 of rotor 144/244, and spin direction 256 of rotor 144/244, housing 101/201, first projection unit 170*a*/270*a*, second projection unit 170*b*/270*b*, and projection screen 160/260. FIG. 2B further shows thickness 266 of projection screen 160/260, as well as horizontal axis 253 (hereinafter also "Y axis 253") substantially parallel to surface 250 and perpendicular to each of horizontal X axis 252 and vertical Z axis 254.

Rotor 144/244 is configured to spin housing 101/201, first projection unit 170*a*/270*a* and second projection unit 170*b*/270*b* mounted on or otherwise secured to housing 101/201, and projection screen 160/260 about axis of rotation 258 of rotor 244, which is parallel to vertical Z axis 254. As noted above, thickness 266 of projection screen 160/260 may be sufficiently thin to allow first projection surface 162*a*/262*a* and second projection surface 262*b* opposite first projection surface 162*a*/262*a* to be precisely aligned on axis of rotation 258, and so as to be centered on axis of rotation 258. For example, in some implementations, thickness 266 of projection screen 160/260 may be less, or substantially less, than 0.2 mm. Moreover, in some implementations, projection screen 160/260 may be laminated between transparent plastic films, such as acrylic or plexiglass films for example, adjacent each of first projection surface 162a/262a and second projection surface 262b.

According to the exemplary implementation shown in FIG. 2B, each of first and second projection units 170a/270a and 170b/270b includes at least a projector projecting away from projection screen 160/260 and a mirror, and may further include a shutter situated between the projector and the mirror. Thus, first projection unit 170a/270a includes at least first projector 272a configured to project away from projection screen 160/260 and having light emission source 278a, such as a projector lamp, for example, as well as first mirror 276a. In addition, in some implementations, first projection unit 170a/270a may include first shutter 274a situated between first projector 272a and first mirror 276a. Second projection unit 170b/270b includes at least second projector 272b opposite first projector 272a, and second mirror 276b. Second projector 272b having light emission source 278b, such as a projector lamp, for example, is also configured to project away from projection screen 160/260. In addition, in some implementations, second projection unit 170b/270b may include second shutter 274b situated between second projector 272b and second mirror 276b.

As shown in FIG. 2B, in some implementations, first projection unit 170a/270a includes first mirror 276a configured to reflect first perspective 117a/217a of floating image 116 projected by first projector 272a onto first projection surface 162a/262a of projection screen 160/260. Furthermore, and as also shown in FIG. 2B, in those implementations, second projection unit 170b/270b includes second mirror 276b configured to reflect second perspective 117b/217b of floating image 116 projected by second projector 272b onto second projection surface 262b of projection screen 160/260.

In implementations in which first shutter 274a and second shutter 274b are included in respective first projection unit 170a/270a and second projection unit 170b/270b, first and second shutters 274a and 274b may be used to control when, for how long, and at what point in a rotation of rotor 144/244 respective first and second perspectives 117a/217a and 117b/217b of floating image 116 are displayed, for example by controlling the display interval of first and second projectors 272a and 272b. In other words, first and second shutters 274a and 274b may open during each display interval to enable first projector 272a to project first perspective 117a/217a of floating image 116 to first mirror 276a, and to enable second projector 272b to project second perspective 117b/217b of floating image 116 to second mirror 276b. Conversely, first and second shutters 274a and 274b may be closed during other intervals of the rotation of rotor 144/244, first projector 272a, second projector 272b, and projection screen 160/260 about axis of rotation 258.

First and second shutters 274a and 274b may be implemented using any type of shutter that is sufficiently fast and lightweight. In some implementations, first and second shutters 274a and 274b may be electronic shutters, such as liquid-crystal, electrochromic, or ferroelectric shutters, for example. In other implementations, first and second shutters 274a and 274b may be implemented as mechanical shutters. In one exemplary implementation, first and second shutters 274a and 274b may be implemented as twisted nematic field effect (TN) liquid-crystal shutters in order to minimize mechanical wear and to provide fast switching speeds.

In implementations in which first shutter 274a and second shutter 274b are omitted from first projection unit 170a/270a and second projection unit 170b/270b, first and second light emission sources 278a and 278b of respective first and second projectors 272a and 272b may be used to control the display interval of first and second projectors 272a and 272b. For example, first and second light emission sources 278a and 278b may be selectively illuminated during each display interval to enable first projector 272a to project first perspective 117a/217a of floating image 116 to first mirror 276a, and to enable second projector 272b to project second perspective 117b/217b of floating image 116 to second mirror 276b.

Conversely, first and second light emission sources 278a and 278b may be selectively extinguished during other intervals of the rotation of rotor 144/244, first projector 272a, second projector 272b, and projection screen 160/260 about axis of rotation 258. In other words, first and second light emission sources 278a and 278b may be gated or strobed to enable projection of first perspective 117a/217a of floating image 116 to first mirror 276a and projection of second perspective 117b/217b of floating image 116 to second mirror 276b only during predetermined display intervals.

It is noted that whether such a display interval is controlled using first and second shutters 274a and 274b, or through use of first and second light emission sources 278a and 278b of respective first and second projectors 272a and 272b, there may be multiple display intervals, such as two, three, or more display intervals, during each rotation of rotor 144/244, first projection unit 170a/270a including first projector 272a, second projection unit 170b/270b including second projector 272b, and projection screen 160/260.

Figure 2C:
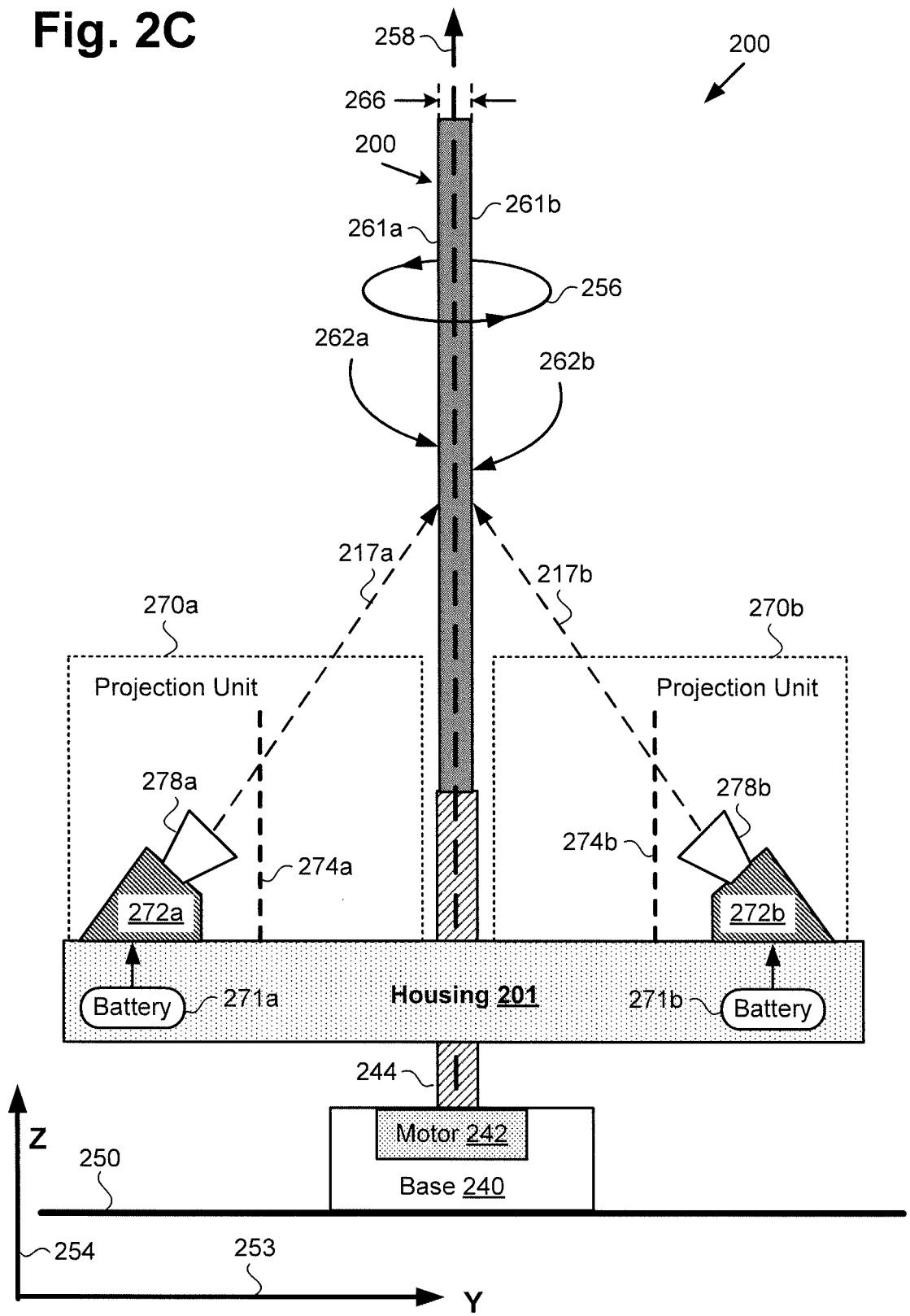
FIG. 2C shows a side view of the exemplary image display system shown in FIG. 2A along perspective lines 2C-2C in that figure, according to another implementation.

FIG. 2C shows a side view of exemplary image display system 100/200 along perspective lines 2C-2C in FIG. 2A, according to another implementation. It is noted that the features identified in FIG. 2C by reference numbers identical to reference numbers shown in FIG. 2A correspond respectively to those previously described features and may share any of the characteristics attributed to those corresponding features by the present disclosure, and vice versa.

Like the implementation shown in FIG. 2B, according to the implementation shown in FIG. 2C, rotor 144/244 is configured to spin housing 101/201, first and second projection units 170a/270a and 170b/270b mounted on or otherwise secured to housing 101/201, and projection screen 160/260 about axis of rotation 258, which is parallel to vertical Z axis 254. As noted above, thickness 266 of projection screen 160/260 may be sufficiently thin to allow first projection surface 162a/262a and second projection surface 262b opposite first projection surface 162a/262a to be precisely aligned on axis of rotation 258, and so as to be centered on axis of rotation 258. For example, in some implementations, thickness 266 of projection screen 160/260 may be less, or substantially less, than 0.2 mm. Moreover, in some implementations, projection screen 160/260 may be laminated between transparent plastic films, such as acrylic or plexiglass films for example, adjacent each of first projection surface 162a/262a and second projection surface 262b.

However, in contrast to the implementation shown in FIG. 2B, according to the exemplary implementation shown in FIG. 2C, each of first and second projection units 170a/270a and 170b/270b includes at least a projector projecting directly onto projection screen 160/260, and may further include a shutter situated between the projector and projection screen 160/260. Thus, in the implementation shown by FIG. 2C, first projection unit 170a/270a includes first projector 272a configured to project first perspective 117a/217a of floating image 116 directly onto first projection surface 162a/262a of projection screen 160/260. Moreover, and as also shown in FIG. 2C, in that implementation, second projection unit 170b/270b includes second projector 272b configured to project second perspective 117b/217b of floating image 116 directly onto second projection surface 262b of projection screen 160/260.

In implementations in which first shutter 274a and second shutter 274b are included in respective first projection unit 170a/270a and second projection unit 170b/270b, first and second shutters 274a and 274b may be used to control when, for how long, and at what point in a rotation of rotor 144/244 respective first and second perspectives 117a/217a and 117b/217b of floating image 116 are projected directly onto projection screen 160/260, for example by controlling the display interval of first and second projectors 272a and 272b, as described above. In other words, first and second shutters 274a and 274b may open during each display interval to enable first projector 272a to project first perspective 117a/217a of floating image 116 directly onto first projection surface 162a/262a, and to enable second projector 272b to project second perspective 117b/217b of floating image 116 directly onto second projection surface 262b. Conversely, first and second shutters 274a and 274b may be closed during other intervals of the rotation of rotor 144/244, first projector 272a, second projector 272b, and projection screen 160/260 about axis of rotation 258.

As noted above, first and second shutters 274a and 274b may be implemented using any type of shutter that is sufficiently fast and lightweight. In some implementations, first and second shutters 274a and 274b may be electronic shutters, such as liquid-crystal, electrochromic, or ferroelectric shutters, for example. In other implementations, first and second shutters 274a and 274b may be implemented as mechanical shutters. In one exemplary implementation, first and second shutters 274a and 274b may be implemented as TN liquid-crystal shutters in order to minimize mechanical wear and to provide fast switching speeds.

In implementations in which first shutter 274a and second shutter 274b are omitted from first projection unit 170a/270a and second projection unit 170b/270b, first and second light emission sources 278a and 278b of respective first and second projectors 272a and 272b may be used to control the display interval of first and second projectors 272a and 272b. For example, first and second light emission sources 278a and 278b may be selectively illuminated during each display interval to enable first projector 272a to project first perspective 117a/217a of floating image 116 directly onto first projection surface 162a/262a, and to enable second projector 272b to project second perspective 117b/217b of floating image 116 directly onto second projection surface 262b.

Conversely, first and second light emission sources 278a and 278b may be selectively extinguished during other intervals of the rotation of rotor 144/244, first projector 272a, second projector 272b, and projection screen 160/260 about axis of rotation 258. In other words, first and second light emission sources 278a and 278b may be gated or strobed to enable projection of first perspective 117a/217a of floating image 116 directly onto first projection surface 162a/262a and projection of second perspective 117b/217b of floating image 116 directly onto second projection surface 262b only during predetermined display intervals.

In the implementations shown by each of FIGS. 2B and 2C, the use of first and second shutters 274a and 274b or first and second light emission sources 278a and 278b to control the display interval of first and second projectors 272a and 272b effectively increases the frame rate of image display system 100/200, by turning on and off mid frame to allow only a narrow range of viewing for each of observers 168a and 168b. As known in the art, the term "frame rate" refers to the rate or frequency with which a new frame can be rendered on a display surface, such as first and second projection surfaces 162a/262a and 262b, expressed in frames per second (fps). Thus, frame rate is to be distinguished from refresh rate, which is the rate or frequency with which the same frame can be redrawn for display.

By controlling first and second shutters 274a and 274b or first and second light emission sources 278a and 278b based upon input from P/R sensor(s) 130 and/or rotational tracking module 131, image display system 100/200 ensures that first and second perspectives 117a/217a and 117b/217b of floating image 116 are enabled and disabled at appropriate times during the rotation of rotor 144/244, first projection unit 170a/270a including first projector 272a, second projection unit 170b/270b including second projector 272b, and projection screen 160/260. First and second shutters 274a and 274b or first and second light emission sources 278a and 278b have the added benefit of reducing motion-blur, i.e., translational blur as well as rotational blur, by providing a narrow temporal window for viewing first and second perspectives 117a/217a and 117b/217b of floating image 116.

The operation of first and second shutters 274a and 274b or strobed first and second light emission sources 278a and 278b can be readily understood by considering a two observer use case, e.g., observers 168a and 168b. When motor 142/242 spins rotor 144/244, first projection unit 170a/270a including first projector 272a, second projection unit 170b/270b including second projector 272b, and projection screen 160/260 at a spin rate of 3600 rpm, for example, and controller 110 outputs a new display frame to each of first and second projectors 272a and 272b during a single rotation (i.e., an independent graphics channel to each of first and second projectors 272a and 272b), each of first and second projectors 272a and 272b is dedicated to one of observers 168a and 168b.

Let us assume that first projector 272a is dedicated to observer 168a while second projector 272b is dedicated to observer 168b. Let us further assume that observers 168a and 168b are positioned 180° apart on opposite sides of a horizontal circle surrounding floating image 116. When first perspective 117a/217a (e.g., a face-to-face or frontal view of floating image 116) from first projector 272a is displayed to observer 168a on first projection surface 162a/262a of projection screen 160/260, first shutter 274a is open or light emission source 278a is strobed on, nominally for 1.0 ms or less. Concurrently, second shutter 274b is open or light emission source 278b is strobed on, also for 1.0 ms or less, to permit observer 168b to see second perspective 117b/217b (backside view of floating image 116) displayed on the opposite, second projection surface 262b of projection screen 160/260. It is noted that first and second shutters 274a and 274b are closed or first and second light emission sources 278a and 278b are strobed off at all other times during each rotation of rotor 144/244, preventing observers 168a and 168b from viewing images other than those which are appropriate to their location and perspective of floating image 116.

With faster image generation and projector update rates, additional observers can be added, with first and second shutters 274a and 274b being open or first and second light emission sources 278a and 278b being strobed on during multiple display intervals each rotation. For example, with graphics generator and projector update rates of one hundred and eighty hertz (180 Hz), each of first and second projection units 170a/270a and 170b/270b can display up to three unique images per 3600 rpm (60 Hz) rotation cycle, (where each shutter or light emission source turns on briefly at three, equally spaced positions around the rotation perimeter) such that six observers can perceive a one of six different perspectives of floating image 116.

It is noted that the illusion of floating image 116 as a three-dimensional (3D) floating image is created by the rapid spin rate of rotor 144/244, first projection unit 170a/270a including first projector 272a, second projection unit 170b/270b including second projector 272b, and projection screen 160/260. One advantage of using first and second projection units 170a/270a and 170b/270b, and two-sided projection screen 160/260 having thickness 266, is that images projected on opposite first and second projection surfaces 162a/262a and 262b of projection screen 160/260 are both essentially situated on axis of rotation 258, greatly reducing motion-blur created by offset of projection screen 160/260 from the exact center of rotation. In contrast, a typical flat panel display has a substantially larger thickness due to the integration of electronics in the housing of such a display. It is noted that even a few millimeters of flat panel display screen thickness can create unacceptable motion-blur due to the fact that a rotating display surface that is offset from the axis of rotation of the display surface creates an effective translational blur in addition to the motion-blur due purely to rotation (i.e., rotational blur). Thus, the use of the rotating projection system as described herein is advantageous over the use of rotating transmissive flat panel display solutions that attempt to achieve a similar floating image effect.

Figure 3:
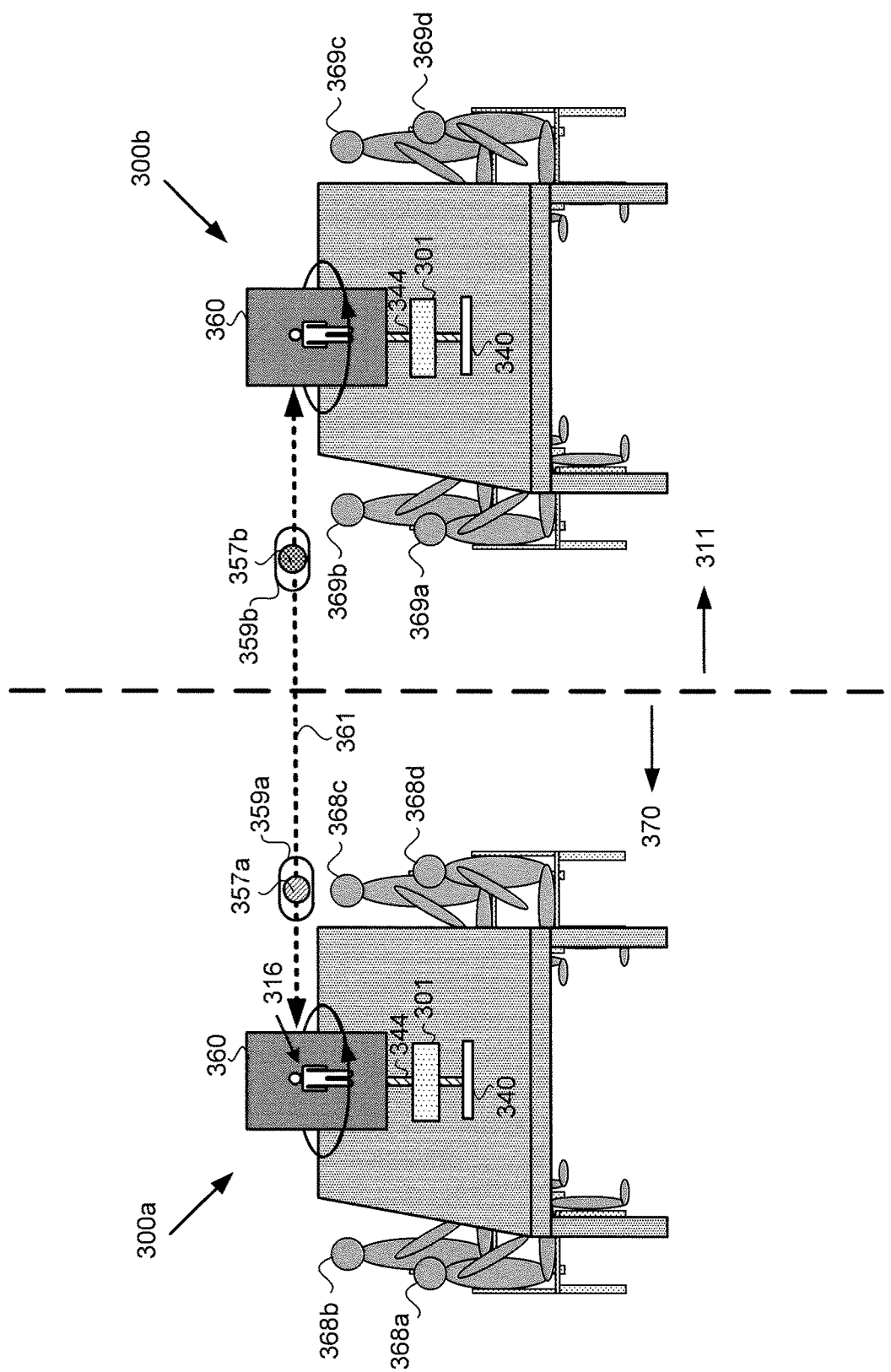
FIG. 3 shows an exemplary use case for the image display systems of FIGS. 1, 2A, 2B, and 2C.

FIG. 3 shows an exemplary use case for image display system 100/200 according to one implementation. FIG. 3 shows image display system 300a implemented in local venue 370 utilized by local users 368a, 368b, 368c, and 368d (hereinafter "local users 368a-368d"), as well as remote image display system 300b implemented in remote venue 311 utilized by remote users 369a, 369b, 369c, and 369d (hereinafter "remote users 369a-369d"). It is noted that local venue 370 corresponds in general to the venue local to image display systems 100/200 described above, while remote venue 311 corresponds in general to remote venue 111 in FIG. 1A. Moreover, local users 368a and 368b correspond in general to observers 168a and 168b, in FIG. 1A.

As shown in FIG. 3, each of image display system 300a and remote image display system 300b includes base 340, housing 301, and projection screen 360. As further shown in FIG. 3, image display system 300a and remote image display system 300b each includes rotor 344 coupling base 340 to housing 301 and projection screen 360. In addition, FIG. 3 shows floating image 316 of remote venue 111/311, generated by image display system 300a. Also shown in FIG. 3 are audio-visual data 359b including image data 357b corresponding to remote venue 111/311, local audio-visual data 359a including local image data 357a of local venue 370, and wireless communication link 361 between image display system 300a and remote image display system 300b.

Image display system 300a and remote image display system 300b correspond in general to image display system 100/200, in FIGS. 1A, 2A, 2B, and 2C. As a result, image display system 300a and remote image display system 300b may share any of the characteristics attributed to image display system 100/200 by the present disclosure, and vice versa. For example, like image display system 100/200, image display system 300a and remote image display system 300b may include sensor network 120 bridging base 340 and housing 301. In addition, rotor 344 and base 340 correspond in general to rotor 144/244 and base 140/240 in FIGS. 1A, 2A, 2B, and 2C. Thus, rotor 344 and base 340 may share any of the characteristics attributed to rotor 144/244 and base 140/240 by the present disclosure, and vice versa. That is to say, although not explicitly shown in FIG. 3, base 340 includes motor 142/242.

Moreover, housing 301 and projection screen 360 correspond respectively in general to housing 101/201 and projection screen 160/260, in FIGS. 1A, 2A, 2B, and 2C. Thus, housing 301 and projection screen 360 may share any of the characteristics attributed to respective housing 101/201 and projection screen 160/260 by the present disclosure, and vice versa. In other words, although not explicitly shown in FIG. 3, housing 301 may include features corresponding respectively to computing platform 102 including transceiver 104, controller 110 having CPU 112, GPU(s) 113, and DSP 114, as well as system memory 106 storing software code 108. In addition, computing platform 102 of housing 101/301 may be communicatively coupled to one or more of audio system 115, 360° degree camera 118, and laser 119. Furthermore, housing 301 may include first and second projection units corresponding respectively to first and second projection units 170a/270a and 270b/270b situated on opposite sides of projection screen 160/260/360 and configured to rotate with rotor 144/244/344, housing 101/201/301, and projection screen 160/260/360.

It is noted that floating image 316 of remote venue 111/311 corresponds to floating image 116, in FIG. 1A, and those corresponding features may share any of the characteristics attributed to either of floating image 116 and floating image 316 by the present disclosure. Each of local venue 370 and remote venue 111/311 may correspond to a video conferencing venue in an office complex, hospital, university, or hotel business center, for example. Alternatively, each of local venue 370 and remote venue 111/311 may correspond to a residential venue enabling remote located family members to enjoy a virtual family reunion.

As yet another alternative, each of local venue 370 and remote venue 111/311 may correspond to a gaming venue enabling participation in a multi-player video game by remote users 369a-369d as well as local users 368a-368d. In implementations in which local venue 370 and remote venue 111/311 are gaming venues, for example, local users 368a-368d may correspond to local players of a multi-player video game, while remote users 369a-369d may correspond to remote players of the multi-player video game.

According to the exemplary implementation shown in FIG. 3, image data 357b of remote venue 111/311 including remote users 369a-369d, as well as audio data generated at remote venue 111/311, may be received by image display system 300a at local venue 370 as audio-visual data 359b via wireless communication link 361. The audio data included in audio-visual data 359b may be broadcast to local users 368a-368d by audio system 115, while image data 357b corresponding to remote venue 111/311 is displayed on projection screen 160/260/360 of image display system 300a. As a result, and due to spinning of rotor 144/244/344, housing 101/201/301, and projection screen 160/260/360, as described above, floating image 116/316 of remote venue 111/311 may appear to local users 368a-368d as 3D interactive floating image 116/316 of remote venue 111/311 including remote users 369a-369d.

Substantially concurrently with spinning of rotor 144/244/344, housing 101/201/301, and projection screen 160/260/360 of image display system 300a to generate floating image 116/316, local image data 357a of local venue 370 including local users 368a-368d may be obtained by image display system 300a using one or more of camera(s) 138b, 360° camera 118, laser 119, and laser sensor 122*f*. Local image data 357*a*, along with local audio data obtained using microphone(s) 124, for example, may be transmitted to remote image display system 300*b* at remote venue 111/311 as local audio-visual data 359*a* via wireless communication link 361.

As another example use case, image display system 100/200/300*a* and remote image display system 300*b* can be used for social or business interactions in a number of different exemplary implementations. For example, in one implementation, each of local users 368*a*-368*d* could view remote venue 111/311 from a perspective substantially matching their individual locations within local venue 370, reduced in size to fit projection screen 160/260/360 of image display system 100/200/300*a*.

Figure 4:
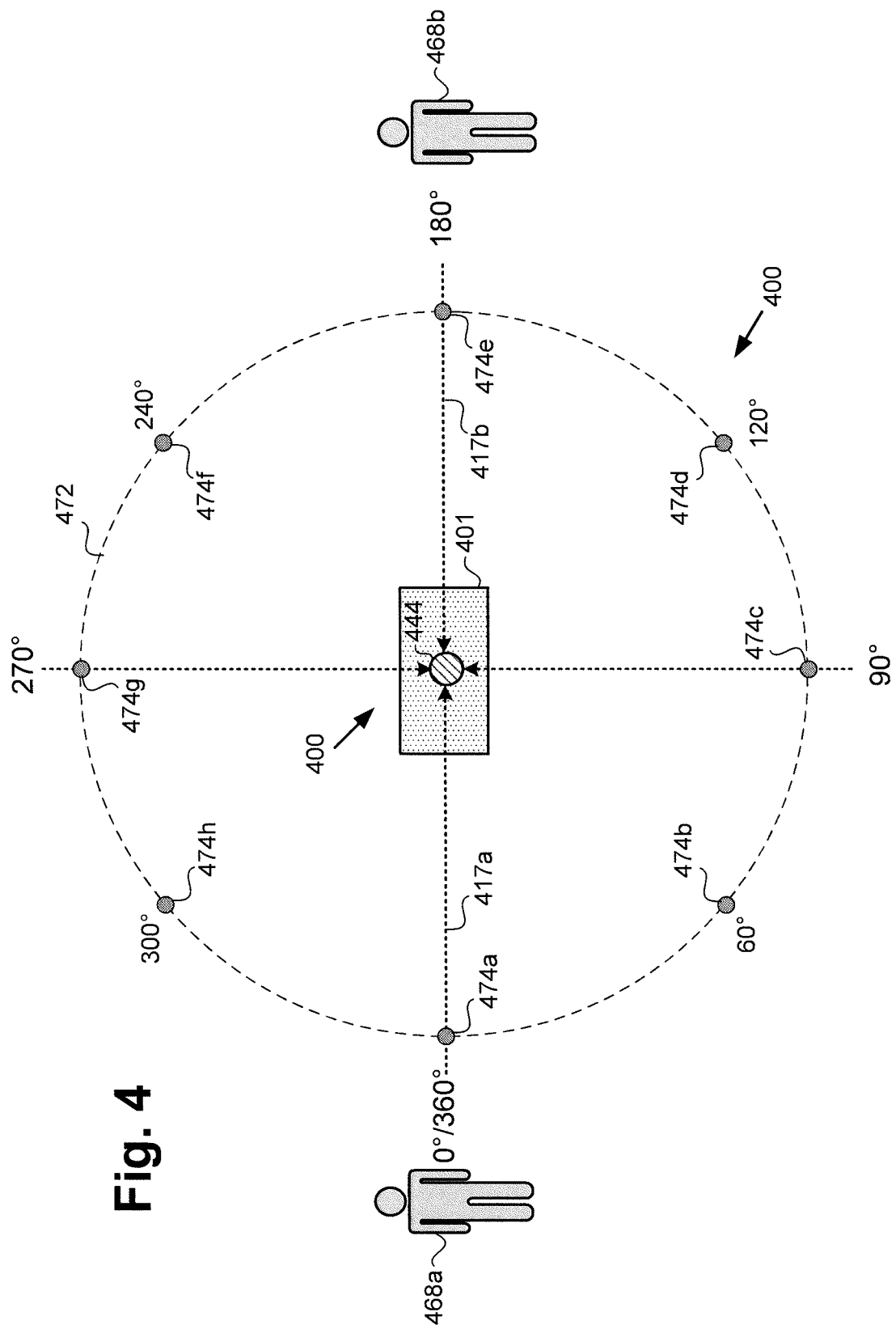
FIG. 4 shows a diagram of exemplary locations for viewing different perspectives of a floating image free of motion-blur displayed by the systems and according to the methods disclosed in the present application.

FIG. 4 shows a top view of a multi-perspective image viewing environment including image display system 400 including rotor 444 configured to spin housing 401. It is noted that projection screen 160/260/360, first and second projection units 170*a*/270*a* and 170*b*/270*b*, internal features of housing 401, and base 140/240/340 including motor 142/242 are not shown in FIG. 4 in the interests of conceptual clarity.

As shown in FIG. 4, the multi-perspective image viewing environment also includes circle 472 of exemplary locations 474*a*, 474*b*, 474*c*, 474*d*, 474*e*, 474*f*, 474*g*, and 474*h* (hereinafter "locations 474*a*-474*h*") from which to observe floating image 116, in FIG. 1A. Also shown in FIG. 4 are observer 468*a* viewing first perspective 417*a* of floating image 116, and observer 468*b* viewing second perspective 417*b* of floating image 116. It is noted that circle 472 including exemplary locations 474*a*-474*h* for viewing different perspectives of floating image 116 is substantially concentric with rotor 444.

Image display system 400 including rotor 444 and housing 401 corresponds in general to image display system 100/200/300*a* and to remote image display system 300*b* in FIGS. 1A, 2A, 2B, 2C, and 3 (hereinafter "image display system 100/200/300*a*/300*b*"). Thus, image display system 400, rotor 444, and housing 401 may share any of the characteristics attributed to respective image display system 100/200/300*a*/300*b*, rotor 144/244/344, and housing 101/201/301 by the present disclosure, and vice versa. In addition, observer 468*a*, observer 468*b*, first perspective 417*a*, and second perspective 417*b* correspond respectively in general to observer 168*a*, observer 168*b*, first perspective 117*a*, and second perspective 117*b*, in FIG. 1A. In addition, first perspective 417*a* and second perspective 417*b* correspond respectively in general to first perspective 217*a* and second perspective 217*b* in FIGS. 2A, 2B, and 2C.

In one exemplary use case, observer 168*a*/468*a* may be at location 474*a* corresponding to a zero crossing of circle 472, i.e., 0° or 360° along the circumference of circle 472, as detectable using sensor network 120. From that location, observer 168*a*/468*a* may face a front side of floating image 116, for example, and view floating image 116 displayed by image display system 100/200/300*a*/300*b*/400 from frontal first perspective 117*a*/217*a*/417*a*. By contrast, observer 168*b*/468*b* located so as to face a backside of floating image 116 from location 474*e*, i.e., a location 180° apart from location 474*a* of observer 168*a*/468*a*, would view floating image 116 as if from backside second perspective 117*b*/217*b*/417*b*. In other words, in an exemplary use case in which floating image 116 is observable from two locations corresponding to location 474*a* and 474*e*, image display system 100/200/300*a*/300*b*/400 may display two perspectives of floating image 116.

In other use cases, however, more perspectives of floating image 116 may be displayed. For example, in one implementation, circle 472 may include four locations for viewing floating image 116 that are 90° apart with respect to circle 472, e.g., locations 474*a*, 474*c*, 474*e*, and 474*g*. In that implementation, first and second perspectives 117*a*/217*a*/417*a* and 117*b*/217*b*/417*b* may once again be respective frontal and backside perspectives of floating image 116, while the perspectives viewable from locations 474*c* and 474*g* may be opposing side views of floating image 116 (i.e. left and right side view perspectives).

As another example, in implementations in which circle 472 includes six locations for viewing floating image 116, e.g., locations 474*a*-474*h*, each of those locations may be 60° apart with respect to circle 472. In that implementation, image display system 100/200/300*a*/300*b*/400 may be configured to display six distinct perspectives of floating image 116 that correspond respectively to locations 474*a*-474*h*. It should be understood, that with an increasing spin rate and an increasing number of alternating and distinct views (e.g. up to 360 distinct views), up to 360° holographic view of floating image 116 may be achieved.

Figure 5:
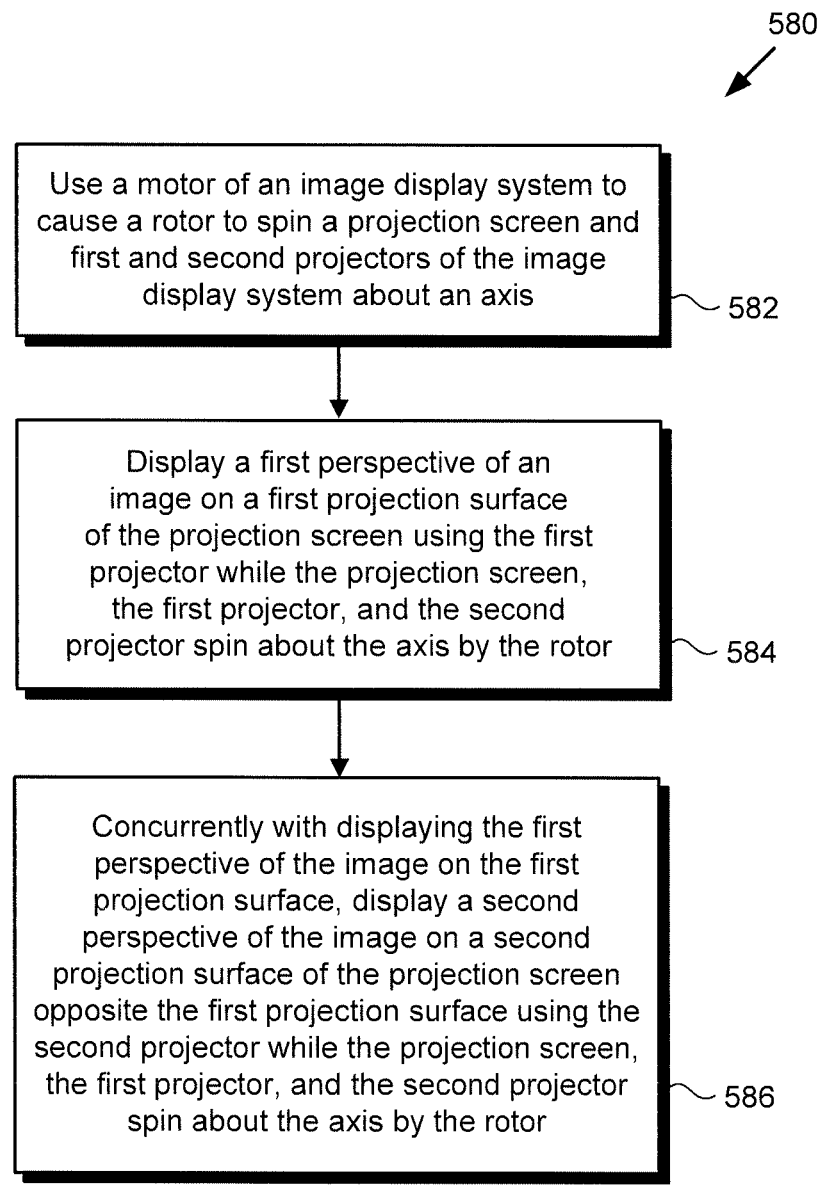
FIG. 5 shows a flowchart outlining an exemplary method for use by an image display system for generating multiple perspectives of a floating image free of motion-blur, according to one implementation.

The functionality of image display system 100/200/300*a*/300*b*/400 will be further described by reference to FIG. 5. FIG. 5 shows flowchart 580 of an exemplary method for use by an image display system for generating multiple perspectives of a floating image free of motion-blur. With respect to the method outlined in FIG. 5, it is noted that certain details and features have been left out of flowchart 580 in order not to obscure the discussion of the inventive features in the present application.

Referring to FIG. 5 in combination with FIGS. 1A, 2A, 2B, 3, and 4, flowchart 580 begins with using motor 142/242 to cause rotor 144/244/344/444 to spin projection screen 160/260/360, first projector 272*a*, and second projector 272*b* about axis of rotation 258 (action 582). Referring to FIG. 1A, in some implementations, controller 110 may be configured to utilize motor 142/242 to cause rotor 144/244/344/444 to spin projection screen 160/260/360, first projector 272*a*, and second projector 272*b* about axis of rotation 258. In some implementations, CPU 112 of controller 110 may execute software code 108 to control motor 142/242 so as to cause rotor 144/244/344/444 to spin projection screen 160/260/360, first projector 272*a*, and second projector 272*b* about axis of rotation 258.

Flowchart 580 continues with displaying first perspective 117*a*/217*a*/417*a* of floating image 116 on first projection surface 162*a*/262*a* of projection screen 160/260/360 using first projector 272*a* while projection screen 160/260/360, first projector 272*a*, and second projector 272*b* spin about axis of rotation 258 by rotor 144/244/344/444 (action 584). Display of first perspective 117*a*/217*a*/417*a* of floating image 116 on first projection surface 162*a*/262*a* of projection screen 160/260/360 may be performed by controller 110. For example, in some implementations, controller 110 may utilize a first GPU of GPU(s) 113 to generate first perspective 117*a*/217*a*/417*a* of floating image 116 for display using first projector 272*a*.

As shown in FIG. 2B, in some implementations, first projector 272*a* may project first perspective 117*a*/217*a*/417*a* away from first projection surface 162*a*/262*a* and toward first mirror 276*a*. In those implementations, first mirror 276*a* is configured to reflect first perspective 117*a*/217*a*/417*a* onto first projection surface 162*a*/262*a* of projection screen 160/260/360 in action 584. Alternatively, and as shown in FIG. 2C, in some implementations, first mirror 276*a* may be omitted, and first projector 272*a* may project first perspective 117*a*/217*a*/417*a* directly onto first projection surface 162*a*/262*a*.

In addition, and as discussed above, one of first shutter 274*a* and light emission source 278*a* of first projector 272*a* may be utilized to control a display interval of first projector 272*a* to precisely control when, for how long, and at what point in the rotation of projection screen 160/260/360, first projector 272*a*, and second projector 272*b* about axis of rotation 258 the display of first perspective 117*a*/217*a*/417*a* on first projection surface 162*a*/262*a* occurs. Depending on the spin rate of rotor 144/244/344/444, projection screen 160/260/360, first projector 272*a*, and second projector 272*b* about axis of rotation 258, the display interval of first projector 272*a* that is controlled using one of first shutter 274*a* and light emission source 278*a* of first projector 272*a* may be less than or equal to 1.0 ms, such as 0.5 ms, or less, for example.

Flowchart 580 can conclude with, concurrently with displaying first perspective 117*a*/217*a*/417*a* of floating image 116 on first projection surface 162*a*/262*a* of projection screen 160/260/360 using first projector 272*a*, displaying second perspective 117*b*/217*b*/417*b* of floating image 116 on second projection surface 262*b* of projection screen 160/260/360 using second projector 272*b* while projection screen 160/260/360, first projector 272*a*, and second projector 272*b* spin about axis of rotation 258 by rotor 144/244/344/444 (action 586). Display of second perspective 117*b*/217*b*/417*b* of floating image 116 on second projection surface 262*b* of projection screen 160/260/360 may be performed by controller 110. For example, in some implementations, controller 110 may utilize a second GPU of GPU(s) 113 to generate second perspective 117*b*/217*b*/417*b* of floating image 116 for display using second projector 272*b*.

As shown in FIG. 2B, in some implementations, second projector 272*b* may project second perspective 117*b*/217*b*/417*b* away from second projection surface 262*b* and toward second mirror 276*b*. In those implementations, second mirror 276*b* is configured to reflect second perspective 117*b*/217*b*/417*b* onto second projection surface 262*b* of projection screen 160/260/360 in action 586. Alternatively, and as shown in FIG. 2C, in some implementations, second mirror 276*b* may be omitted, and second projector 272*b* may project second perspective 117*b*/217*b*/417*b* directly onto second projection surface 262*b*.

In addition, and as discussed above, one of second shutter 274*b* and light emission source 278*b* of second projector 272*b* may be utilized to control a display interval of second projector 272*b* to precisely control when, for how long, and at what point in the rotation of projection screen 160/260/360, first projector 272*a*, and second projector 272*b* about axis of rotation 258 the display of second perspective 117*b*/217*b*/417*b* on second projection surface 262*b* occurs. Depending on the spin rate of rotor 144/244/344/444, projection screen 160/260/360, first projector 272*a*, and second projector 272*b* spin about axis of rotation 258, the display interval of second projector 272*b* that is controlled using one of second shutter 274*b* and light emission source 278*b* of second projector 272*b* may be less than or equal to 1.0 ms, such as 0.5 ms, or less, for example.

In implementations in which the display interval of first projector 272*a* and second projector 272*b* are controlled using respective first and second shutters 274*a* and 274*b*, controller 110 may further determine a substantially optimum timing for opening and closing first and second shutters 274*a* and 274*b*. In one such implementation, for example, controller 110 may receive P/R data from one or more of P/R sensor(s) 130, such as Hall effect sensor 134*b*, and may determine a substantially optimum timing for opening and closing first and second shutters 274*a* and 274*b* based on the P/R data. In that implementation, controller 110 may then control first and second shutters 274*a* and 274*b* based on the determrined timing.

It is noted that although the display interval of first projector 272*a* and the display interval of second projector 272*b* will typically share the same time duration, they may not always coincide. For example, referring to FIGS. 1A and 4, if observers of floating image 116 are positioned at locations 474*a*, 474*c*, and 474*e* on circle 472, the display intervals for frontal first perspective 117*a*/217*a*/417*a* and backside second perspective 117*b*/217*b*/417*b* of floating image 116 being displayed to respective observers 468*a* and 468*b* may coincide. However, only one of first projector 272*a* or second projector 272*b* need be utilized to display a side perspective of floating image 116 to the observer at location 474*c*, while no opposite perspective of floating image 116 need be displayed for viewing from vacant location 474*g*. In general, the display interval of first projector 272*a* and the display interval of second projector 272*b* will coincide when image display system 100/200/300*a*/300*b*/400 generates an even number of perspectives of floating image 116 for display to observers symmetrically located on circle 472, i.e., at locations 474*a*, 474*c*, 474*e*, and 474*g*, or at locations 474*b*, 474*d*, 474*f*, and 474*h*, or at locations 474*a*-474*h*.

It is further noted that the spin rate at which rotor 144/244/344/444, projection screen 160/260/360, first projector 272*a*, and second projector 272*b*, spin about axis of rotation 258 may depend in part on the frame rate of image display system 100/200/300*a*/300*b*/400. In addition to the frame rate of image display system 100/200/300*a*/300*b*/400, the spin rate with which rotor 144/244/344/444, projection screen 160/260/360, first projector 272*a*, and second projector 272*b* spin or rotate about axis of rotation 258 may be based on the number of perspectives of floating image 116 being displayed by image display system 100/200/300*a*/300*b*/400.

Thus, the present application discloses systems and methods for displaying multiple perspectives of a floating image that are substantially free of motion-blur, using spinning projectors. By using projectors to display different perspectives of an image on opposite projection surfaces of a projection screen while spinning the projection screen and the projectors using a motor and a rotor, the systems and methods disclosed by the present application enable the generation of multiple perspectives of the image as an apparently 3D floating image. Moreover, by substantially centering the projection surfaces on an axis of rotation of the rotor while precisely controlling a display interval during which the projectors can display the perspectives on the opposite projection surfaces, the present solution advantageously enables generation of the multiple perspectives of the 3D floating image having no perceptible rotational or translational blur. As a result, the image display solution disclosed by the present application advantageously enables realistic, engaging, and immersive group interactions among group participants whether those participants are present in a common venue or are physically remote from one another.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image display system comprising:
    a motor configured to spin a rotor;
    a first projector;
    a second projector;
    a projection screen having a first projection surface on a first side of the projection screen and a second projection surface on a second side of the projection screen opposite to the first side; and
    a controller configured to:
        cause the motor to spin the rotor that spins the projection screen, the first projector, and the second projector about an axis;
        display a first perspective of an image on the first projection surface of the projection screen using the first projector while the projection screen, the first projector, and the second projector spin about the axis by the rotor; and
        concurrently with displaying the first perspective of the image on the first projection surface of the projection screen using the first projector, display a second perspective of the image on the second projection surface of the projection screen using the second projector.

2. The image display system of claim 1, wherein the first projector and the second projector are configured to project the respective first and second perspectives of the image directly onto the projection screen.

3. The image display system of claim 2, further comprising a first shutter situated between the first projector and the projection screen, and a second shutter situated between the second projector and the projection screen, wherein a display interval of the first projector and the second projector is controlled using the first shutter and the second shutter.

4. The image display system of claim 1, further comprising a first mirror configured to reflect the first perspective of the image onto the first projection surface, and a second mirror configured to reflect the second perspective of the image onto the second projection surface.

5. The image display system of claim 4, further comprising a first shutter situated between the first projector and the first mirror, and a second shutter situated between the second projector and the second mirror, wherein a display interval of the first projector and the second projector is controlled using the first shutter and the second shutter.

6. The image display system of claim 1, wherein a display interval of the first projector and the second projector is controlled using respective first and second shutters, and wherein the controller is further configured to:
    receive at least one of position or rotation data from a sensor of the image display system;
    determine a timing for opening and closing the first and second shutters based on the at least one of position or rotation data; and
    control the first and second shutters based on the determined timing.

7. The image display system of claim 1, wherein a display interval of the first projector and the second projector is controlled using a light emission source of the first projector and a light emission source of the second projector.

8. The image display system of claim 1, wherein a display interval of the first projector and the second projector is less than or equal to one millisecond (≤1.0 ms).

9. The image display system of claim 1, wherein the image display system is configured to generate one of four perspectives of the image observable 90° apart with respect to a circle concentric with the rotor, and six perspectives of the image observable 60° apart with respect to the circle concentric with the rotor.

10. The image display system of claim 1, wherein the image appears to be a three-dimensional (3D) image floating in space.

11. A method for use by an image display system including a motor configured to spin a rotor that spins a first projector, a second projector, and a projection screen having a first projection surface on a first side of the projection screen and a second projection surface on a second side of the projection screen opposite to the first side, the method comprising:
    causing the motor to spin the rotor that spins the projection screen, the first projector, and the second projector about an axis;
    displaying a first perspective of an image on the first projection surface of the projection screen, using the first projector, while the projection screen, the first projector, and the second projector spin about the axis by the rotor; and
    concurrently with displaying the first perspective of the image on the first projection surface of the projection screen using the first projector, displaying a second perspective of the image on the second projection surface of the projection screen, using the second projector.

12. The method of claim 11, wherein the first and second perspectives of the image are displayed by being projected directly onto the projection screen.

13. The method of claim 12, further comprising using a first shutter situated between the first projector and the projection screen, and a second shutter situated between the second projector and the projection screen to control a display interval of the first projector and the second projector.

14. The method of claim 11, wherein the first perspective of the image is displayed by being reflected onto the first projection surface by a first mirror, and the second perspective of the image is displayed by being reflected onto the second projection surface by a second mirror.

15. The method of claim 14, further comprising using a first shutter situated between the first projector and the first mirror, and a second shutter situated between the second projector and the second mirror to control a display interval of the first projector and the second projector.

16. The method of claim 11, wherein a display interval of the first projector and the second projector is controlled using respective first and second shutters, and wherein the method further comprises:
    receiving at least one of position or rotation data from a sensor of the image display system;
    determining a timing for opening and closing the first and second shutters based on the at least one of position or rotation data; and
    controlling the first and second shutters based on the determined timing.

17. The method of claim 11, wherein a display interval of the first projector and the second projector is controlled using a light emission source of the first projector and a light emission source of the second projector.

18. The method of claim 11, wherein a display interval of the first projector and the second projector is less than or equal to one millisecond (≤1.0 ms).

19. The method of claim 11, wherein the method generates one of four perspectives of the image observable 90° apart with respect to a circle concentric with the rotor, and six perspectives of the image observable 60° apart with respect to the circle concentric with the rotor.

20. The method of claim 11, wherein the image appears to be a three-dimensional (3D) image floating in space.

* * * * *